United States Patent [19]
Miles

[11] Patent Number: 6,027,057
[45] Date of Patent: Feb. 22, 2000

[54] WEAR-RESISTANT, SELF-REPLENISHING MAGNETIZED GRINDING MILL LINER

[75] Inventor: David Roger Miles, 4345 Turner Rd., Kelowna, British Columbia, Canada, V1W 1R4

[73] Assignees: David Roger Miles, Canada; Rampage Ventures, Inc., Cayman Islands

[21] Appl. No.: 09/073,405

[22] Filed: May 6, 1998

[51] Int. Cl.[7] ................................................. B02C 17/22
[52] U.S. Cl. ..................... 241/182; 29/428; 241/DIG. 30
[58] Field of Search .................................... 241/182, 183, 241/DIG. 30; 29/428

[56] References Cited

U.S. PATENT DOCUMENTS

| | | |
|---|---|---|
| 3,913,851 | 10/1975 | Andersson . |
| 4,340,616 | 7/1982 | Weinert . |
| 4,424,938 | 1/1984 | Day . |

FOREIGN PATENT DOCUMENTS

| | | |
|---|---|---|
| 0022758 | 1/1981 | European Pat. Off. . |
| 6908206 | 12/1970 | Netherlands . |
| 1708413 | 1/1992 | U.S.S.R. . |
| 1757740 | 8/1992 | U.S.S.R. . |
| 1790446 | 1/1993 | U.S.S.R. . |
| 2218653 | 11/1989 | United Kingdom . |

Primary Examiner—Mark Rosenbaum
Attorney, Agent, or Firm—Oyen, Wiggs, Green & Mutala

[57] ABSTRACT

A grinding mill liner having inward and outward layers. The outward layer is formed of a relatively soft, shock-absorbent material and the inward layer is formed of a relatively hard, impact and abrasion resistant material. A plurality of magnets are embedded in the inward layer. A pair of pole pieces are positioned on opposed sides of each magnet and embedded in the inward layer. The pole pieces extend above the magnet, protecting it from the impact forces to which the liner is subjected during operation of the grinding mill. The pole pieces also focus the magnetic field forces emanating from the magnet. The magnets are arranged in rows, with adjacent poles of adjacent pairs of magnets within each row having alternate polarity; and, with adjacent poles of adjacent pairs of magnets in adjacent pairs of the rows having alternate polarity. The rows are parallel to one another and extend transversely to the direction in which material flows across the liner during operation of the grinding mill. The liner is made up of a number of circumferentially adjoining sections. Each section slopes upwardly from a longitudinally extending rearward face toward a longitudinally extending forward face. The respective faces of each section extend transversely to the direction in which material flows across the liner. Each section may be a separate tile. The tiles are removably and interlockably attached to the grinding mill's drum to form the liner.

32 Claims, 6 Drawing Sheets

WEAR-RESISTANT, SELF-REPLENISHING MAGNETIZED GRINDING MILL LINER

TECHNICAL FIELD

This application pertains to a magnetized grinding mill liner. The liner is "self-replenishing" in that chips or particles broken away from the grinding media are attracted to and incorporated onto the liner. Magnets embedded in the liner are sandwiched between pole pieces which focus the magnetic field and protect the magnets.

BACKGROUND

Grinding mills such as ball mills are commonly used for crushing ore. A typical grinding mill comprises a large rotatable drum containing grinding media (typically steel balls having a diameter of three inches or more). Ore in the form of rocks is dumped into the drum. As the drum rotates, the significant impact forces generated by multiple collisions between the ore, drum and grinding media gradually crushes the ore into small particles which are ultimately removed from the drum for further processing.

The impact forces produced during operation of the grinding mill also result in degradation of the grinding media and the inner lining of the drum. Steel chips or particles break away from the grinding media, eventually wearing the media down to a size at which they lose much of their effectiveness. Worn media and media chips, particles, etc. having a size smaller than the diameter of the drum's discharge outlet are eventually flushed through the mill's discharge trunnion, together with the crushed ore. New grinding media must be added to the drum on a continual basis to replenish the worn media. Furthermore, the worn media, chips, particles, etc. discharged from the drum must somehow be separated from the crushed ore. That can be a time consuming, expensive, labour-intensive process. It is also necessary to regularly replace the inner liner of the drum, since the grinding process also wears out the liner.

A variety of hard drum liner materials have been used in an effort to prolong the life of a grinding mill drum liner. Magnetic liner materials have also been employed, in part because such materials have improved wear-resistant characteristics, and in part because such materials can magnetically attract and retain on the liner itself chips or particles broken away from the grinding media. See for example U.S. Pat. No. 4,340,616 which discloses a method for decreasing the wear on a surface such as a grinding mill liner by incorporating magnetic material into the liner so as to attract particulate material to and incorporate same on the liner, thereby providing a sacrificial wear-resistant liner surface. Also see U.S. Pat. No. 3,913,851 which discloses a wear resistant grinding mill liner which is magnetically retained in place on the grinding mill drum.

The methodology of U.S. Pat. No. 4,340,616 utilizes a flexible magnetic composite material coated with a magnetite concentrate. Although this may be appropriate for improving the wear resistant capability of a pipe for conveying an abrasive slurry, it is inappropriate for use in a grinding mill, since the high impact forces caused by repeated pounding of the ore rock, steel balls, etc. on the liner quickly destroys the relatively fragile magnetized liner. The present invention overcomes these disadvantages.

SUMMARY OF THE INVENTION

The invention provides a grinding mill liner having inward and outward layers. The outward layer is formed of a relatively soft, shock-absorbent material such as 55A durometer polyurethane material and the inward layer is formed of a relatively hard, impact and abrasion resistant material such as 80A durometer polyurethane material. A plurality of magnets are embedded in the inward layer. A pair of pole pieces are positioned on opposed sides of each magnet and embedded in the inward layer. The pole pieces extend above the magnet, protecting it from the impact forces to which the liner is subjected during operation of the grinding mill. The pole pieces also focus the magnetic field forces emanating from the magnet.

The magnets are preferably arranged in rows, with adjacent poles of adjacent pairs of magnets within each row having alternate polarity; and, with adjacent poles of adjacent pairs of magnets in adjacent pairs of the rows having alternate polarity. The rows are parallel to one another and extend transversely to the direction in which material flows across the liner during operation of the grinding mill.

Advantageously, the liner is made up of a number of circumferentially adjoining sections. Each section slopes upwardly from a longitudinally extending rearward face toward a longitudinally extending forward face. The respective faces of each section extend transversely to the direction of material flow across the liner. Preferably, each section is a separate tile. The tiles are removably and interlockably attached to the grinding mill's drum to form the liner. A plurality of recesses may be formed in the outward layer to improve its shock-absorbing characteristics.

The invention also provides a tile for forming a grinding mill liner by removably interlockably attaching a plurality of such tiles to the inner surface of the grinding mill's drum. Each tile has inward and outward layers. The outward layer is formed of a relatively soft, shock-absorbent material such as 55A durometer polyurethane material and the inward layer is formed of a relatively hard, impact and abrasion resistant material such as 80A durometer polyurethane material. A plurality of magnets are embedded within the inward layer. A pair of pole pieces are positioned on opposed sides of each magnet and embedded in the inward layer. The pole pieces extend above the magnet, protecting it from the impact forces to which the liner is subjected during operation of the grinding mill. The pole pieces also focus the magnetic field forces emanating from the magnet.

The magnets are preferably arranged in rows, with adjacent poles of adjacent pairs of magnets within each row having alternate polarity; and, with adjacent poles of adjacent pairs of magnets in adjacent pairs of the rows having alternate polarity. The rows are parallel to one another, such that when the tiles are attached to the drum to form the liner, the rows extend transversely to the direction in which material flows across the liner during operation of the grinding mill.

The inward layer of each tile has a forward face, an inward face and a rearward face. The inward face slopes upwardly from the rearward face to the forward face; and, the forward and rearward faces extend transversely to the direction of material flow across the liner when the tiles are attached to the drum to form the liner.

A longitudinally extending recess is formed along the lower underside of the tile's forward face; and, a longitudinal projection is formed along and extends rearwardly from the rearward face. When the tiles are attached to the drum to form the liner, the recess of one tile interlockingly receives the projection of another identical tile.

A keyway is formed in the bottom of each tile's outward layer. This facilitates removable attachment of the tile to the drum by slidably advancing the keyway along a mating protrusion such as a pair of spaced apart nuts fastened over bolts protruding through the drum, or such as a bar shaped to match the keyway and fixed on the drum's inner surface.

The invention further provides a method of lining a grinding mill drum by forming an outward liner layer of a relatively soft, shock-absorbent material, forming an inward liner layer of a relatively hard, impact and abrasion resistant material atop the outward layer; and, embedding a plurality of magnets within the inward layer. A pair of pole pieces are embedded within the inward layer on opposed sides of each magnet and extending above the magnet. The magnets are arranged in a plurality of rows, with adjacent poles of adjacent pairs of magnets within each of the rows having alternate polarity, and with adjacent poles of adjacent pairs of magnets within adjacent pairs of the rows having alternate polarity.

DESCRIPTION

Figure 1:
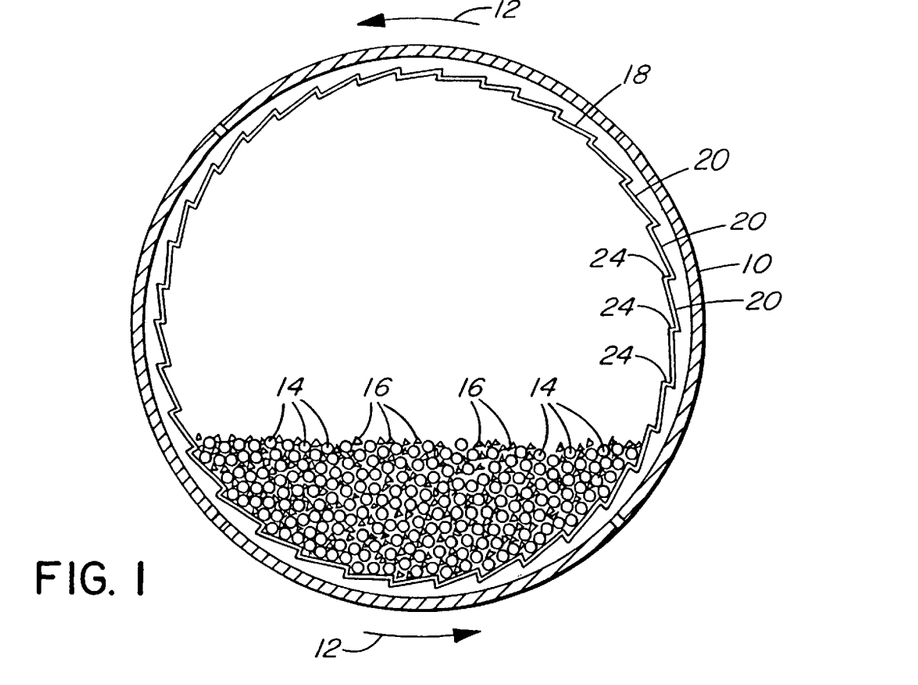
FIG. 1 is a schematic cross-sectional illustration of a grinding mill drum incorporating a liner in accordance with the present invention.

FIG. 1 depicts a grinding mill drum 10 which is rotated in the direction of arrows 12 by a conventional drive mechanism (not shown). Drum 10 is charged, in conventional fashion, with a plurality of steel grinding balls 14 and with ore in the form of rocks 16. The objective is to crush or pulverize the ore into a particulate, powder or slurry form to facilitate further processing of the ore by other means.

Drum 10 is provided, in accordance with the invention, with a liner 18 formed of a plurality of interlocking magnetic tiles 20. (Tiles 20 need not necessarily interlock, but it is advantageous that they do so if liner 18 is to replace a prior art liner formed of interlocking segments). As best seen in FIGS. 4A through 4E, each tile 20 has a tapered, wedge-like shape. More particularly, each tile 20 has a top or inward face 22 which slopes upwardly from rearward face 26 to forward face 24. A transverse channel 28 formed in the forward portion of the planar bottom or outward face 30 of tile 20 serves as a keyway for removably attaching tile 20 to drum 10. Specifically, bolts (not shown) are passed through holes provided in drum 10. Nuts (not shown) are then loosely fastened onto the bolt ends which protrude inside drum 10. The nuts are sized and shaped to fit within channels 28. Keyway channel 28 is then aligned with two or more spaced apart nuts and tile 20 is then manipulated to slide keyway channel 28 over the nuts until tile 20 reaches its desired position within drum 10. The bolts are then tightened to draw tile 20 firmly against the inner surface of drum 10. Alternatively, tile 20 can be removably fastened to drum 10 by any other suitable means, such as by fixing a plurality of bars on the inner surface of drum 10, with each bar having a shape matching that of one of channels 28 such that any channel 28 can be slidably advanced over any one of the bars.

Figure 4A:
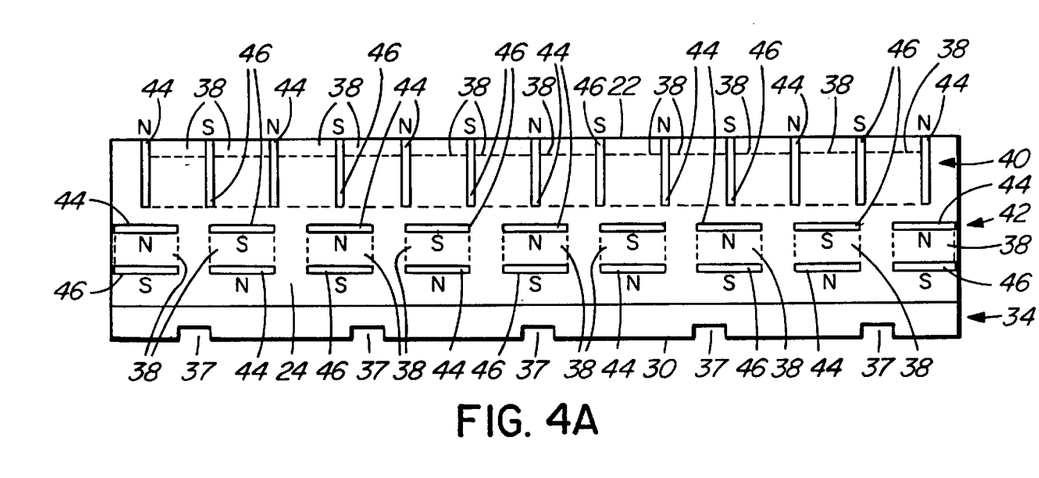
FIGS. 4A, 4B, 4C, 4D and 4E are respectively front elevation, partially fragmented side elevation, top plan, side perspective, and front perspective illustrations of one of the magnetic tiles incorporated in the preferred liner.
Figure 4B:
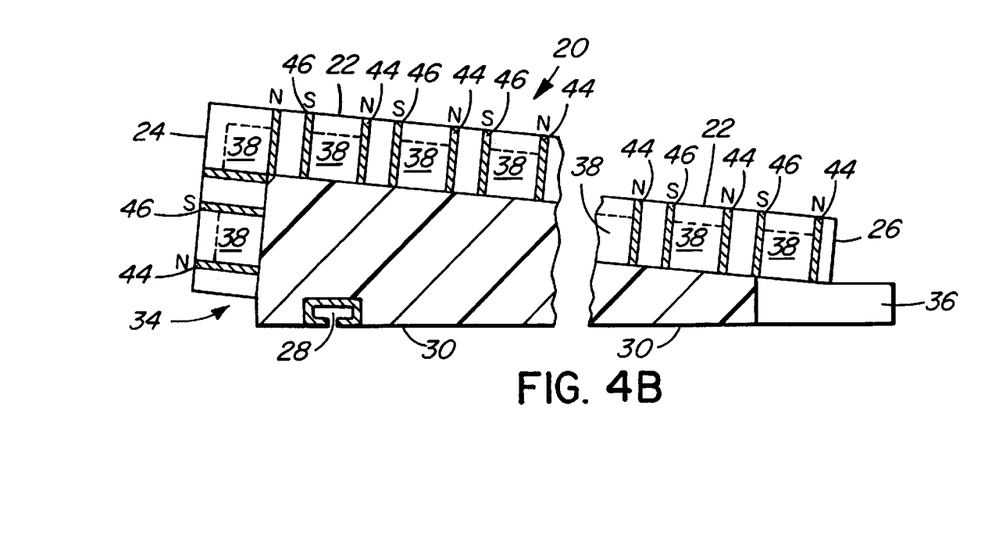
Figure 4C:
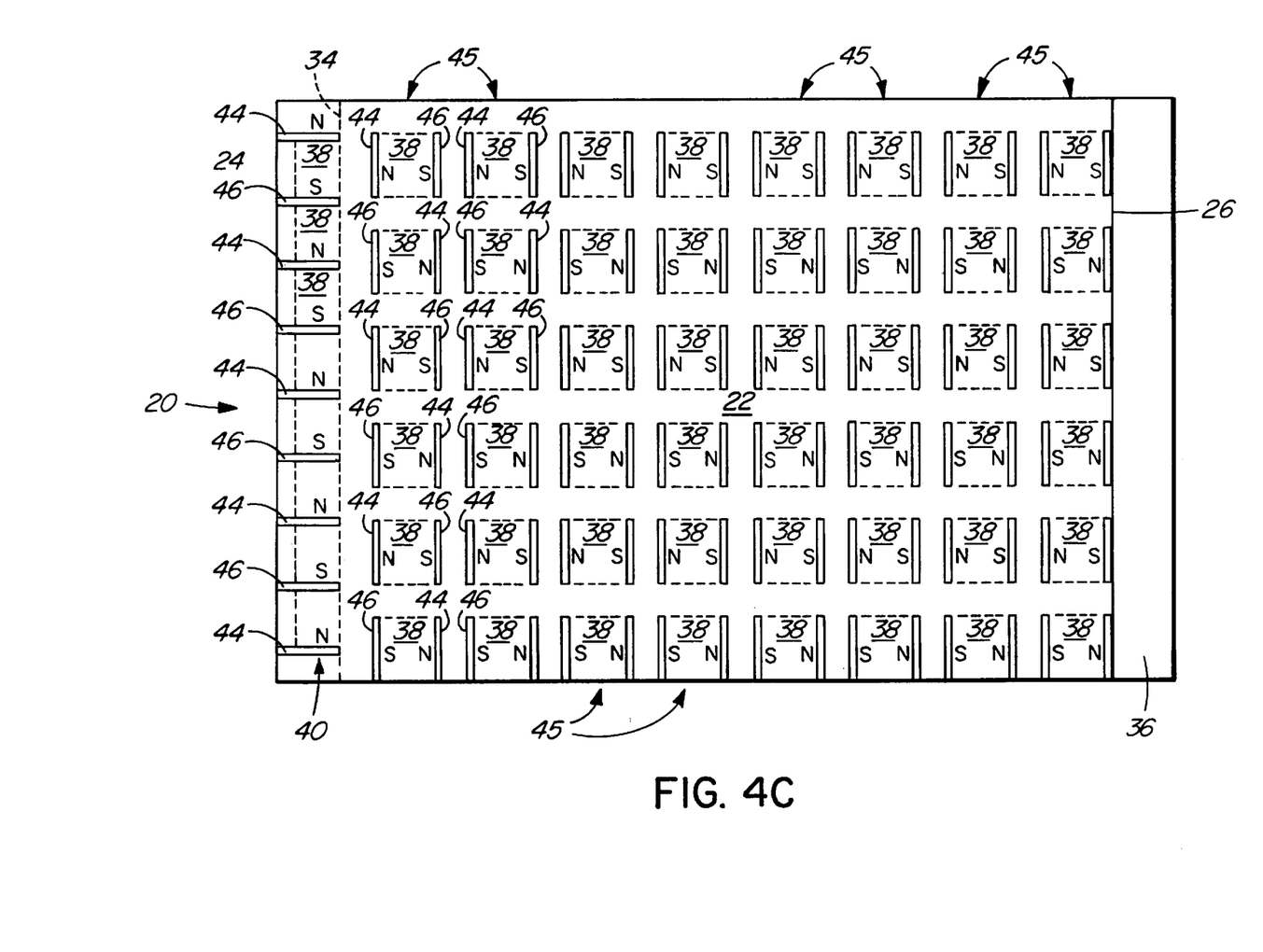
Figure 4D:
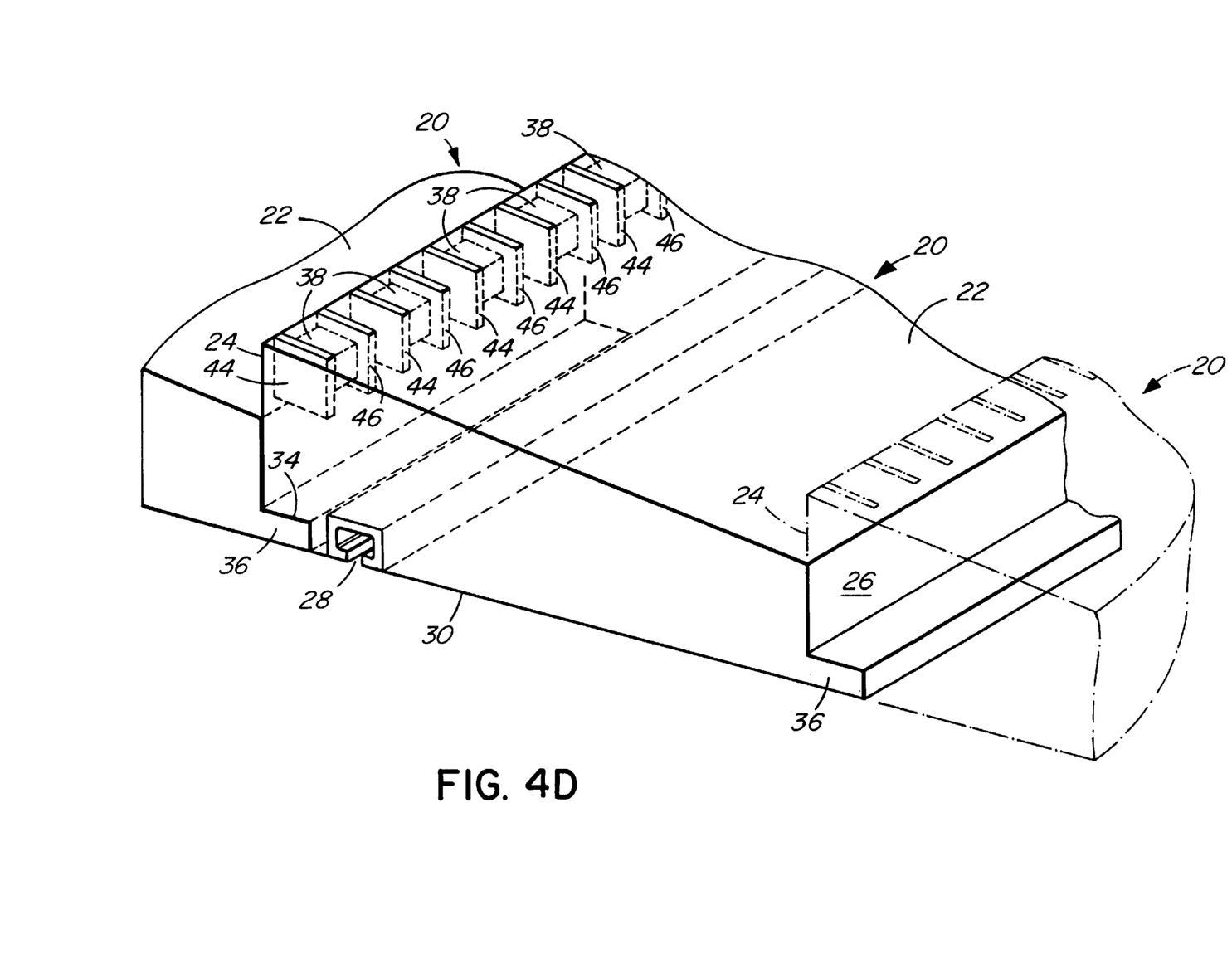

A longitudinal step-like recess 34 is formed transversely along the lower underside of each tile's forward face 24. A mating longitudinal projection 36 is formed to extend transversely along and rearwardly from each tile's rearward face 26. When tiles 20 are removably attached within drum 10 as aforesaid, each tile's projection 36 is slidably received within the recessed portion 34 of the immediately adjacent tile, as best seen in FIG. 4D. The tiles are thus firmly interlockingly engaged with one another to form a circumferentially continuous liner within drum 10, as best seen in FIG. 1.

Tiles 20 are oriented with their respective forward faces 24 ahead of their respective rearward faces 26, when viewed in the direction of drum rotation indicated by arrows 12 (FIG. 1). This orientation, coupled with the tiles' tapered, wedge-like shape is advantageous because as drum 10 rotates, the forward faces 24 of the tiles beneath balls 14 and rocks 16 contact balls 14 and rocks 16, imparting rotational lifting forces thereto. Balls 14 and rocks 16 are thus lifted away from the drum's liner and tend to spin somewhat. Such lifting and spinning enhances the ability of balls 14 to crush or pulverize rocks 16.

A further advantage of the tiles' tapered, wedge-like shape is that chips or particles magnetically adhered to the tiles' top or inward faces 22 are less likely to be dislodged. Specifically, as drum 10 rotates, a portion of the mass of balls 14 and rocks 16 slides over the top or inward faces 22 of the tiles beneath the mass. If the sliding mass contacts chips or particles magnetically adhered to the tiles' top or inward faces 22, the resultant impact forces may dislodge the magnetically adhered chips or particles by, in effect, "wiping" them off the tiles' top or inward faces 22. This wiping effect is reduced by giving tiles 20 a tapered, wedge-like shape as aforesaid.

Figure 2:
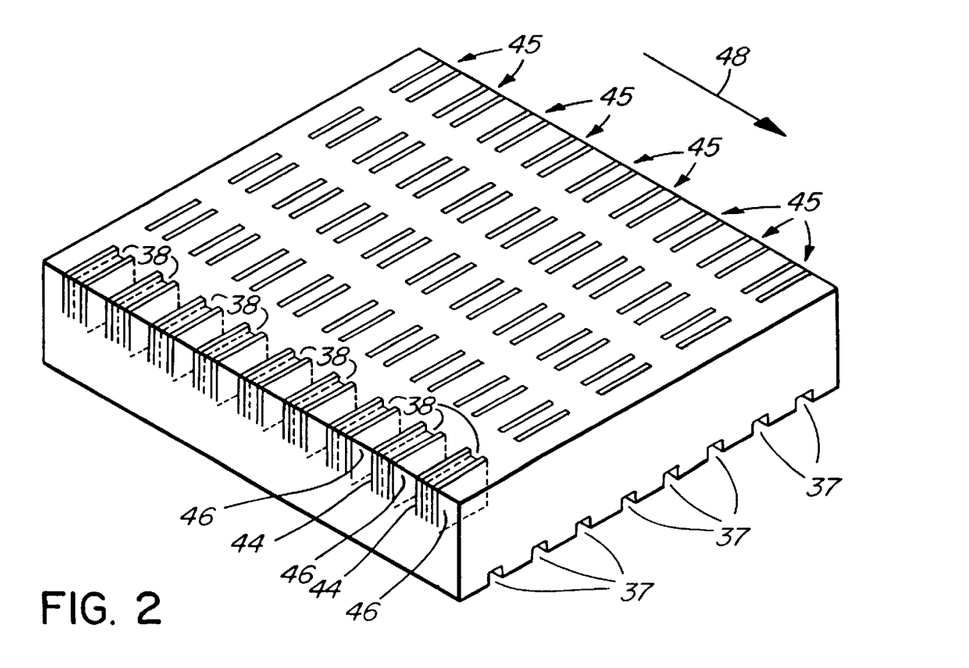
FIG. 2 is a partially fragmented perspective illustration of a portion of the preferred liner.
Figure 3:
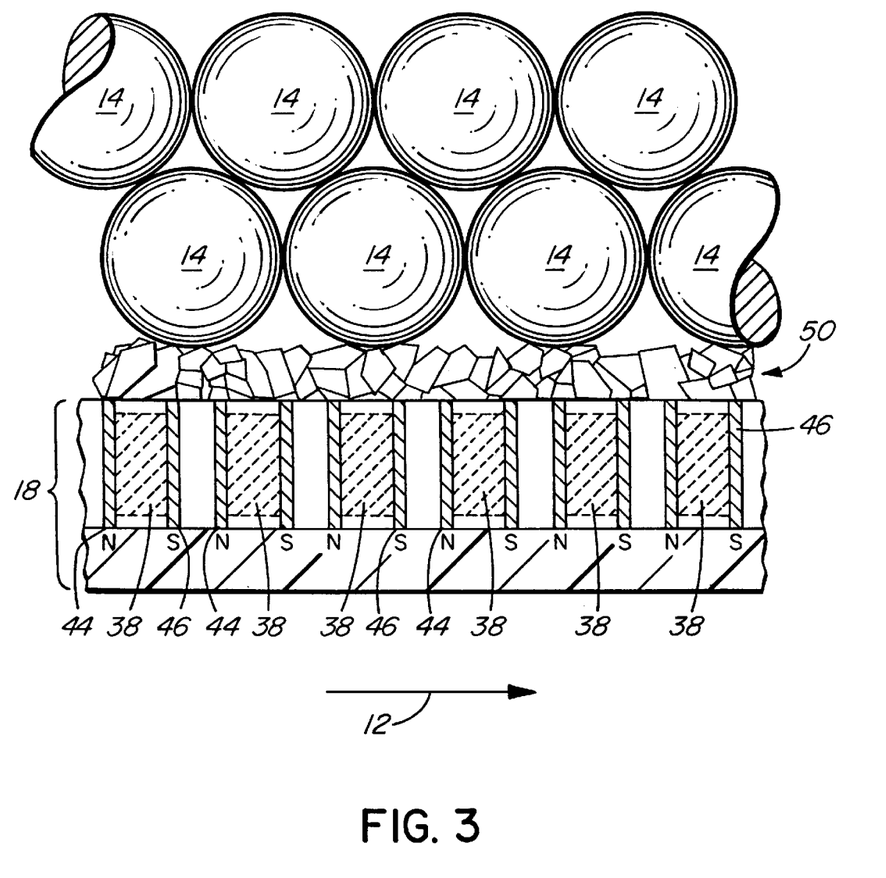
FIG. 3 is an enlarged cross-sectional illustration depicting a portion of the preferred liner and showing steel chips magnetically adhered thereto, with an adjacent plurality of steel grinding media.
Figure 4E:
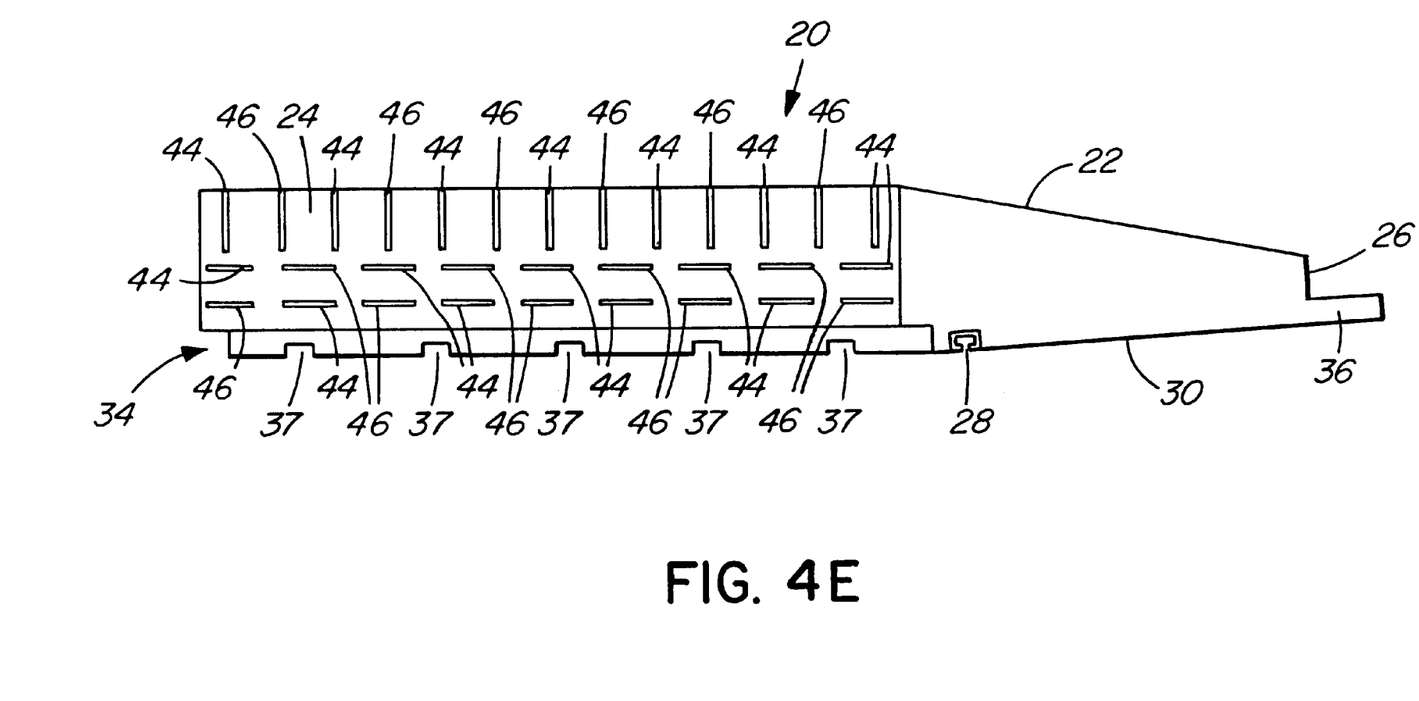

Each tile 20 is made up of two separate layers consisting of different types of material. Each material may be an elastomer such as polyurethane. Specifically, the outward layer of tile 20 indicated by cross hatching in FIGS. 2, 3 and 4B is preferably formed of relatively soft 55A durometer polyurethane material which provides a shock absorbing capability. The inward layer of tile 20 (i.e. inward face 22, forward face 24, rearward face 26 and rearward projection 36) is preferably formed of a harder, impact and abrasion resistant 80A durometer polyurethane material. Suitable 55A and 80A durometer polyurethane material is manufactured by the chemical division of Uniroyal Inc., Naugatuck, Conn., under product designations Uniroyal™ Vibrathane™ 8050 and Uniroyal™ Vibrathane™ 8083 respectively. As best seen in FIGS. 4A and 4E, a plurality of parallel, grooved recesses 37 are formed in the bottom or outward face 30 of tile 20. Recesses 37 improve the shock-absorbing capability of the outward portion of tile 20 by allowing the portions of tiles 20 surrounding the respective recesses 37 to flex into the recesses.

A plurality of magnets 38, each having a north pole "N" and a south pole "S" are embedded within the inward face 22, forward face 24, and rearward face 26 of each tile 20. More particularly, as best seen in FIGS. 4A and 4B, upper and lower rows 40, 42 of magnets 38 are embedded within forward face 24. As best seen in FIGS. 4B and 4C, further rows 45 of magnets 38 are embedded within inward and rearward faces 22, 26. Each magnet 38 in each of rows 40, 42, 45 is sandwiched between a pair of impact-resistant pole pieces 44, 46. Pole pieces 44, 46 are preferably steel plates having a height dimension greater than the height dimension of magnets 38. This allows pole pieces 44, 46 to be embedded within tile 20 with the upper (i.e. inward) ends of pole pieces 44, 46 substantially flush with the exposed outer surfaces of inward, forward and rearward faces 22, 24, 26 respectively and with magnets 38 protectively recessed between their respective pole pieces away from the surfaces of inward, forward and rearward faces 22, 24, 26. Pole pieces 44, 46 accordingly protect magnets 38 from the impact forces to which liner 18 is subjected during operation of the grinding mill. Pole pieces 44, 46 also serve to focus the magnetic field forces emanating from magnets 38.

Within each pair of longitudinally adjacent rows of magnets, adjacent magnets in each row are oriented to alternate the polarities of that magnet pair. Thus, the south ("S") pole of each magnet 38 in one row is oriented to face the north ("N") pole of the immediately adjacent magnet in the next row, and vice versa. Similarly, adjacent pairs of magnets within each individual row are oriented to alternate the polarities of that magnet pair, as illustrated by the "N" and "S" pole designations in FIGS. 4A, 4B and 4C.

The above-described orientation of magnets 38 assists in providing full magnetic field coverage over the inward, forward and rearward faces 22, 24, 26 of each tile 20 while minimizing "dead spots" (i.e. regions of reduced magnetic field coverage having reduced capability to magnetically adhere chips or particles). Magnets 38 may be formed of a suitable magnetic material, such as grade 5 ceramic.

As best seen in FIG. 2, magnet rows 45 embedded within tile 20's inward face 22 extend transversely to the direction 48 of material flow across liner 18. This further enhances resistance to the aforementioned "wiping effect" by which chips or particles magnetically adhered to the tiles' top or inward faces 22 may be dislodged. Specifically, chips or particles magnetically attracted by transversely extending magnet rows 45 tend to form a series of parallel "ribs" above rows 45 which resist the wiping effect.

Tiles 20 can be made by a molding process. For example, a mold (not shown) having the desired shape may be constructed. The mold is inverted and magnets 38 are positioned within the mold, in the same locations as described above in reference to the completed tile 20. Impact and abrasion resistant material in liquified form is then poured into the mold over magnets 38 to form the inward layer of tile 20. Softer, shock-absorbent material in liquified form is then poured into the mold to form the outward layer of tile 20. A chemical bonding action occurs at the interface between the two types of material, securely bonding the two layers together. Before the liquified material hardens, an extruded metal member is embedded in the softer material to form channel 28. A mold cover formed with a series of ribs is then secured atop the mold, to embed the cover's ribs in the softer material and thereby form grooved recesses 37 in the bottom or outward face 30 of tile 20. After the liquified material hardens the mold is opened and the completed tile removed therefrom.

In operation, after tiles 20 are affixed with drum 10 to form liner 18 as aforesaid, drum 10 is charged with balls 14 and ore 16 and then rotated in the direction of arrows 12. The resultant tumbling action causes multiple collisions between balls 14, ore 16 and liner 18, gradually crushing ore 16 into small particles which are ultimately removed from drum 10 for further processing. The shock absorbent characteristics of liner 18 assist in absorbing some of the forces generated by repeated impact of balls 14 and ore 16 with liner 18, thus reducing wear on liner 18 and prolonging its life. Steel chips or particles 50 (FIG. 3) which break away from balls 14 are magnetically attracted to and are held in place on liner 18, eventually building up a self-replenishing protective layer which further reduces wear on liner 18. Magnets 38 embedded within liner 18 are protected from being damaged by the significant impact forces caused by repeated pounding of balls 14 and ore 16 on liner 18 by recessing magnets 38 within the hard material forming inward, forward and rearward faces 22, 24, 26 and by sandwiching each magnet between a protective pair of steel plate pole pieces 44, 46.

As will be apparent to those skilled in the art in the light of the foregoing disclosure, many alterations and modifications are possible in the practice of this invention without departing from the spirit or scope thereof. For example, instead of forming tile 20 with a 90° corner at the junction of faces 22, 24 as seen in FIG. 4B, one could alternatively round or taper the corner. This would reduce the tendency to accumulate a "lip" of magnetically adhered chips or particles at the corner which could eventually be broken away from the corner by the sliding mass of balls 14 and rocks 16. Accordingly, the scope of the invention is to be construed in accordance with the substance defined by the following claims.

What is claimed is:

1. A grinding mill liner comprising:
    (a) inward and outward layers, said outward layer formed of a relatively soft, shock-absorbent material and said inward layer formed of a relatively hard, impact and abrasion resistant material; and,
    (b) a plurality of magnets embedded within said inward layer.

2. A grinding mill liner as defined in claim 1, further comprising, for each one of said magnets, a pair of pole pieces embedded within said inward layer, said pole pieces respectively positioned on opposed sides of said magnet and extending above said magnet.

3. A grinding mill liner as defined in claim 2, further comprising a plurality of shock-absorbing recesses formed in said outward layer.

4. A grinding mill liner as defined in claim 2, wherein said magnets are arranged in a plurality of rows, with adjacent poles of adjacent pairs of magnets within each of said rows having alternate polarity, and with adjacent poles of adjacent pairs of magnets within adjacent pairs of said rows having alternate polarity.

5. A grinding mill liner as defined in claim 4, wherein said rows are respectively parallel to one another and extend transversely to a direction of material flow across said liner.

6. A grinding mill liner as defined in claim 4, wherein said pole pieces have inward ends substantially flush with an exposed outer surface of said inward layer.

7. A grinding mill liner as defined in claim 2, said liner further comprising a plurality of circumferentially adjoining sections, each of said sections sloping upwardly from a longitudinally extending rearward face toward a longitudinally extending forward face, said respective faces extending transversely to a direction of material flow across said liner.

8. A grinding mill liner as defined in claim 7, each of said sections comprising a tile removably and interlockably attachable to a drum.

9. A grinding mill liner as defined in claim 2, wherein said outward layer is formed of 55A durometer polyurethane material and said inward layer is formed of 80A durometer polyurethane material.

10. A grinding mill liner as defined in claim 2, wherein said soft, shock-absorbent material and said hard, impact and abrasion resistant material are elastomeric materials.

11. A tile for forming a grinding mill liner, said tile comprising:

(a) inward and outward layers, said outward layer formed of a relatively soft, shock-absorbent material and said inward layer formed of a relatively hard, impact and abrasion resistant material; and, (b) a plurality of magnets embedded within said inward layer.

12. A tile as defined in claim 11, further comprising, for each one of said magnets, a pair of pole pieces embedded within said inward layer, said pole pieces respectively positioned on opposed sides of said magnet and extending above said magnet.

13. A tile as defined in claim 12, further comprising a plurality of shock-absorbing recesses formed in said outward layer.

14. A tile as defined in claim 12, wherein said magnets are arranged in a plurality of rows, with adjacent poles of adjacent pairs of magnets within each of said rows having alternate polarity, and with adjacent poles of adjacent pairs of magnets within adjacent pairs of said rows having alternate polarity.

15. A tile as defined in claim 14, wherein said rows are respectively parallel to one another and extend transversely to a direction of material flow across said tile.

16. A tile as defined in claim 14, wherein said pole pieces have inward ends substantially flush with an exposed outer surface of said inward layer.

17. A tile as defined in claim 12, wherein said outward layer is formed of 55A durometer polyurethane material and said inward layer is formed of 80A durometer polyurethane material.

18. A tile as defined in claim 12, said inward layer further comprising a forward face, an inward face and a rearward face, said inward face sloping upwardly from said rearward face to said forward face, said respective faces extending transversely to a direction of material flow across said tile.

19. A tile as defined in claim 18, further comprising:

(a) a longitudinally extending recess formed along a lower underside of said forward face; and, (b) a longitudinal projection formed along and extending rearwardly from said rearward face;

said recess for interlockingly receiving said projection of another tile identical to said tile.

20. A tile as defined in claim 19, further comprising a keyway formed in a bottom surface of said outward layer for removably attaching said tile to a drum by slidably advancing said keyway over a mating protrusion fixed with respect to said drum.

21. A tile as defined in claim 12, wherein said soft, shock-absorbent material and said hard, impact and abrasion resistant material are elastomeric materials.

22. A method of lining a grinding mill drum, said method comprising the steps of:

(a) providing a plurality of tiles, each one of said tiles comprising:

(i) an outward layer formed of a relatively soft, shock-absorbent material;

(ii) an inward layer formed of a relatively hard, impact and abrasion resistant material;

(iii) a plurality of magnets embedded within said inward layer; and, (b) fixing an outward-facing portion of each one of said tile outward layers over an inner surface of said drum to leave an inward-facing portion of said tile inward layers forming an impact and abrasion resistant lining of said drum.

23. A method as defined in claim 22, each one of said tiles further comprising, for each one of said magnets, a pair of pole pieces embedded within said inward layer on opposed sides of said one of said magnets and extending above said one of said magnets.

24. A method as defined in claim 23, each one of said tiles further comprising a plurality of shock-absorbing recesses formed in said outward layer.

25. A method as defined in claim 23, each one of said tiles further comprising said magnets arranged in a plurality of rows, with adjacent poles of adjacent pairs of magnets within each of said rows having alternate polarity, and with adjacent poles of adjacent pairs of magnets within adjacent pairs of said rows having alternate polarity.

26. A method as defined in claim 25, each one of said tiles further comprising said rows arranged respectively parallel to one another, said method further comprising, before said fixing, arranging said tiles with said rows extending transversely to a direction of material flow across said lining during rotational operation of said drum.

27. A method as defined in claim 25, each one of said tiles further comprising said pole pieces positioned with inward ends of said pole pieces substantially flush with an exposed outer surface of said inward layer.

28. A method as defined in claim 23, each one of said tiles further comprising said outward layer formed of 55A durometer polyurethane material and said inward layer formed of 80A durometer polyurethane material.

29. A method as defined in claim 23, each one of said tiles further comprising said inward and outward layers formed of an elastomeric material.

30. A method as defined in claim 23, each one of said tiles sloping upwardly from a longitudinally extending rearward face of said one of said tiles toward a longitudinally extending forward face of said one of said tiles said respective faces extending transversely to a direction in which material flows across said lining during rotational operation of said drum.

31. A method as defined in claim 30, wherein said fixing further comprises removably and interlockably attaching said tiles to said drum.

32. A method as defined in claim 31 each one of said tiles further comprising a keyway formed in a bottom surface of said outward layer, said method further comprising:

(a) providing a protrusion on said drum for each one of said tiles, each one of said protrusions sized and shaped for slidably interlockable engagement of said protrusion within one of said keyways; and, (b) removably attaching each one of said tiles to said drum by slidably advancing each one of said keyways along a corresponding one of said protrusions.

* * * * *